(12) United States Patent  
Ashida

(10) Patent No.: US 11,220,287 B2  
(45) Date of Patent: Jan. 11, 2022

(54) STEER-BY-WIRE STEERING APPARATUS

(71) Applicant: TOYOTA JIDOSHA KABUSHIKI KAISHA, Aichi-ken (JP)

(72) Inventor: Manabu Ashida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/722,067

(22) Filed: Dec. 20, 2019

(65) Prior Publication Data

US 2020/0198689 A1 Jun. 25, 2020

(30) Foreign Application Priority Data

Dec. 25, 2018 (JP) .............................. JP2018-241105

(51) Int. Cl.
 *B62D 5/04* (2006.01)
 *B62D 5/00* (2006.01)
 *B62D 1/184* (2006.01)
 *B60R 25/021* (2013.01)

(52) U.S. Cl.
 CPC ........... *B62D 5/0409* (2013.01); *B62D 1/184* (2013.01); *B62D 5/001* (2013.01); *B60R 25/0211* (2013.01)

(58) Field of Classification Search
 CPC .................................................. B60R 25/0211

USPC ........................................................ 180/402  
See application file for complete search history.

(56) References Cited

U.S. PATENT DOCUMENTS 9,457,833 B2 * 10/2016 Dimig ................. B60R 25/0211  
11,084,458 B2 * 8/2021 Tagaya ................... B62D 5/001  
2020/0391784 A1 * 12/2020 Saito ....................... B62D 1/04

FOREIGN PATENT DOCUMENTS

JP 2005-178460 A 7/2005  
JP 2010-167914 A 8/2010

\* cited by examiner

*Primary Examiner* — Kevin Hurley  
*Assistant Examiner* — Hosam Shabara  
(74) *Attorney, Agent, or Firm* — Sughrue Mion, PLLC

(57) ABSTRACT

A steer-by-wire steering apparatus comprises a plurality of locking projections that project radially outward of a upper shaft; a rotation range limiting projection that is fixed to the upper shaft and has an engaged portion located on the radially outer side of outer peripheral ends of the locking projections; a radially movable lock member that is located on the radially outer side than the locking projections when a drive source switch is ON, and has at least a part located at the same radial position as the locking projections when the switch is OFF; and a rotation range limiting member that has at least a part located at the same radial position as the engaged portion regardless of whether or not a steering actuator that changes steered angle of steered wheels is in an operable state when the switch is at least ON.

3 Claims, 5 Drawing Sheets

STEER-BY-WIRE STEERING APPARATUS

CROSS-REFERENCE TO RELATED APPLICATION

This application claims priority to Japanese Patent Application No. JP2018-241105 filed on Dec. 25, 2018, the content of which is hereby incorporated by reference in its entirety into this application.

BACKGROUND

1. Technical Field

The present disclosure relates to a steer-by-wire steering apparatus that steers steered wheels by power of an electric actuator.

2. Description of the Related Art

An example of a steer-by-wire steering apparatus is disclosed in Japanese Patent Application Laid-open Publication No. 2010-167914. The steering apparatus includes an annular flange fixed to an outer peripheral portion of an upper shaft to which a steering wheel is fixed, and two engaging/disengaging members located on the radially outer side of the flange and movable in the radial direction of the upper shaft.

When a vehicle ignition switch (hereinafter sometimes referred to as IG-SW) is in OFF state, one of the engaging/disengaging members is moved toward a central axis of the upper shaft by a first actuator, and engages with one of a plurality of lock grooves formed circumferentially on the outer peripheral portion of the flange. At this time, the other engaging/disengaging member is positioned on the radially outer side of the flange by a second actuator. Consequently, the steering apparatus is in a rotation prohibited state in which rotation of the upper shaft and the steering wheel is prohibited by the one engagement member and the lock groove.

When the IG-SW is in ON state, one engaging/disengaging member is positioned on the radially outer side of the flange by the first actuator. On the other hand, the other engaging/disengaging member is moved toward the central axis of the upper shaft by the second actuator, and its radial position is the same as one convex portion formed on the outer peripheral portion of the flange so as to be located on the radially outer side of the lock groove. Accordingly, when the steering wheel is rotated by a predetermined angle or more, the convex portion contacts the other engaging/disengaging member, so that further rotation of the steering wheel is restricted. That is, the steering apparatus is in a rotation range limited state in which a rotation range of the upper shaft and the steering wheel is limited to a predetermined range.

Further, in the situation where the IG-SW is in the ON state, when a failure occurs in an electric system including a steering motor that operates to steer steered wheels in conjunction with turning operation of the steering wheel, the steering apparatus is in an emergency connection state. That is, a coupling device mechanically connects the upper shaft and a drive mechanism of the steered wheels, and both engaging/disengaging members are positioned on the radially outer side of the flange by the first and second actuators. Therefore, when the steering wheel is operated to rotate, the steered angle of the steered wheels changes by means of the function of the coupling device.

When the steering apparatus disclosed in the above Laid-open Publication is in the emergency connection state, the rotation range of the upper shaft is not limited. However, the steering wheel is usually provided with switches for operating electronic devices, and these switches are connected by cables to a control unit mounted on a vehicle. Therefore, when a rotation range of the upper shaft is not limited, the cables are overloaded when the rotation amount of the steering wheel exceeds a predetermined amount.

SUMMARY

The present disclosure provides a steer-by-wire steering apparatus that is capable of realizing a rotation prohibited state and a rotation range limited state of an upper steering shaft and in which the limitation on the rotation of the upper steering shaft is not completely released.

According to the present disclosure, a steer-by-wire steering apparatus is provided that comprises: an upper shaft that rotates with a steering wheel; a steered angle changing device that includes a steering actuator, is configured to be capable of changing a steered angle of steered wheels by a force generated by the steering actuator and is not mechanically coupled to the upper shaft; a plurality of locking projections that are fixed to the upper shaft so as to be arranged in the rotational direction of the upper shaft and project radially outward of the upper shaft; a rotation range limiting projection that is fixed to the upper shaft and has an engaged portion that is spaced from the locking projections in the rotational direction of the upper shaft and is located on the radially outer side of outer peripheral ends of the locking projections; a radially movable lock member that is located at the same axial position of the upper shaft as that of the locking projections and is configured to be located on the radially outer side than the locking projections when a drive source switch, which switches between an ON state that enables a vehicle drive source to operate and an OFF state that disables the vehicle drive source to operate, is in the ON state, and to have at least a part located at the same radial position as the locking projections when the drive source switch is in the OFF state; and a rotation range limiting member that is located at the same axial position as that of the rotation range limiting projection and is configured to have at least a part located at the same radial position as the engaged portion regardless of whether or not the steering actuator is in an operable state when the drive source switch is at least in the ON state.

In the steer-by-wire steering apparatus according to the present disclosure, when the drive source switch is at least in the ON state, the radially movable lock member is located on the radially outer side of the locking projection, and the radial position of at least a portion of the rotation range limiting member is the same as the engaged portion regardless of whether or not the steering actuator is operable. Therefore, the steering apparatus is put into a rotation range limited state in which the rotation range of the upper shaft and the steering wheel is limited to a predetermined range by the rotation range limiting member and the engaged portion.

On the other hand, when the drive source switch is in the OFF state, the radial position of at least a part of the radially movable lock member is the same as the locking projections, so that the steering apparatus is put into a rotation prohibited state in which the rotation of the upper shaft and the steering wheel is prohibited.

Thus, in the steer-by-wire steering apparatus according to the present disclosure, when the drive source switch is in either the ON state or the OFF state, the limitation on the rotation of the upper shaft and the steering wheel is not completely released regardless of whether or not the steering actuator is in the operable state.

In one aspect of the present disclosure, the rotation range limiting member is the same member as the radially movable lock member, and when the drive source switch is in the ON state, the radial position of the radially movable lock member is the same as the engaged portion regardless of whether or not the steering actuator is in an operable state.

According to the above aspect, the radially movable lock member, which is also the rotation range limiting member, selectively engages with the locking projections and the rotation range limiting projection (engaged portion) according to the state of the drive source switch. Therefore, the steering device of the present disclosure can be made simple in structure as compared to where a member engaged with the locking projections and a member engaged with the rotation range limiting projection are different from each other.

In another aspect of the present disclosure, the rotation range limiting member is a member different from the radially movable lock member, the radial position of the rotation range limiting member is always the same as the engaged portion, and when the drive source switch is in the ON state, the radially movable lock member is positioned on the radially outer side than the engaged portion.

According to the above aspect, the radially movable locking member which is a member with which the locking projection contacts, and the rotation range limiting member, which is a member with which the rotation range limiting projection contacts, are separate members, so that the radially movable locking member and the rotation range limiting member are less likely to deteriorate than when they are the same member.

Other objects, other features and attendant advantages of the present disclosure will be readily understood from the description of the embodiments of the present disclosure described with reference to the following drawings.

DETAILED DESCRIPTION

A steer-by-wire steering apparatus according to an embodiment of the present disclosure will now be described in detail with reference to the accompanying drawings.

Figure 1:
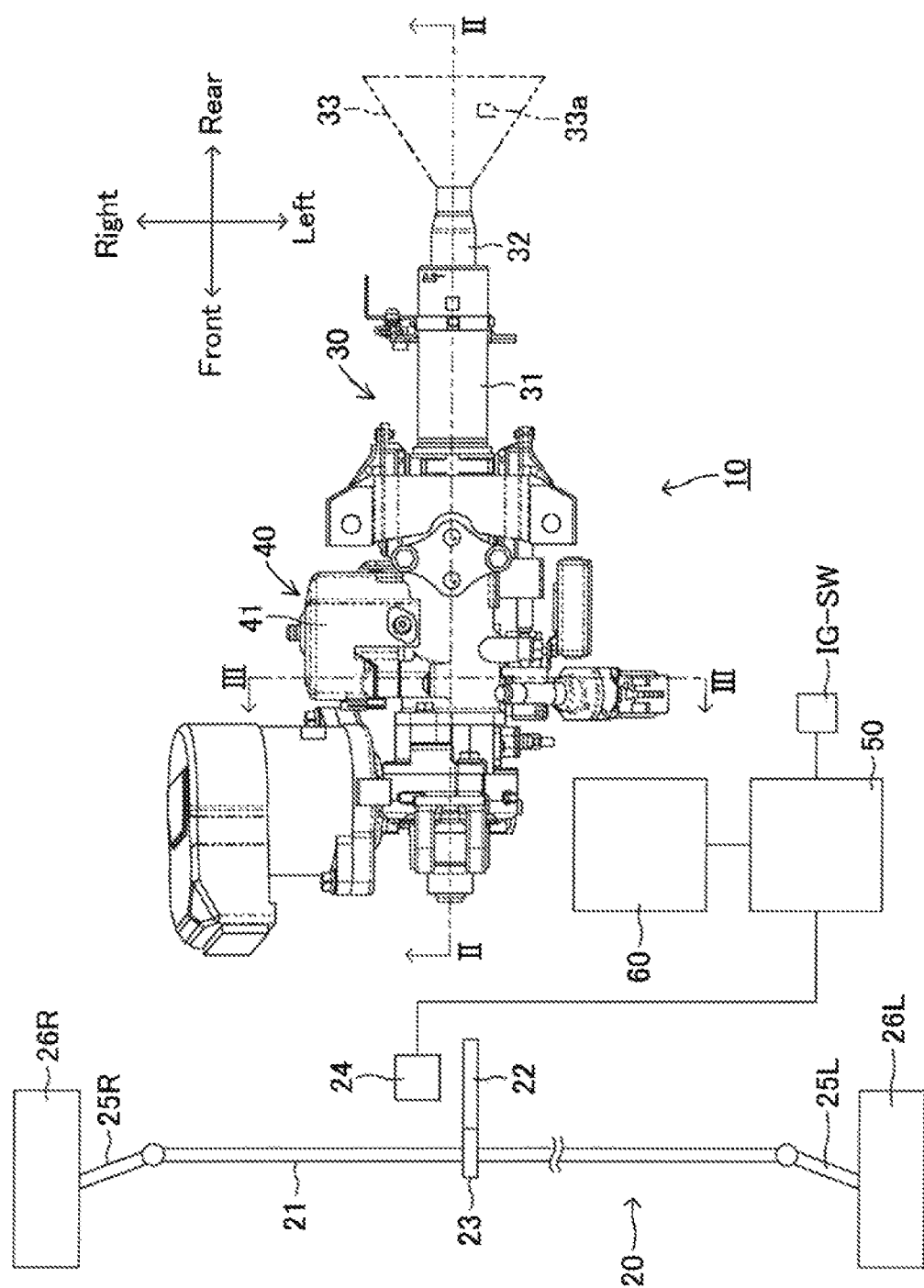
FIG. 1 is a plan view schematically showing a part of a steer-by-wire steering apparatus according to an embodiment of the present disclosure.

As shown in FIG. 1, the steer-by-wire steering apparatus 10 according to an embodiment is applied to a vehicle equipped with an internal combustion engine serving as a vehicle drive source and comprises a rack-and-pinion mechanism 20, a steering column unit 30, a rotation range control device 40, and an ECU 50 as main components. When an ignition switch (hereinafter referred to as IG-SW), which is a drive source switch shown in FIG. 1, is in OFF state, the internal combustion engine is inoperable, and when the IG-SW is in ON state, the internal combustion engine is operable. The IG-SW is connected to the ECU 50 which will be described in detail later.

The rack-and-pinion mechanism 20 shown in FIG. 1 includes a rack bar 21, a pinion shaft 22, a pinion gear 23 and an electric steering motor 24. The rack bar 21 extends in the width direction of the vehicle, is slidable in the width direction relative to a vehicle body, and cannot rotate about its own axis. Rack teeth (not shown) are formed on a part of the outer peripheral surface of the rack bar 21. A pinion gear 23 is fixed to a lower end portion of a pinion shaft 22 that is rotatable about and is not slidable along its own axis, and the pinion gear 23 meshes with the rack teeth of the rack bar 21. The electric steering motor 24 is a steering actuator and is disposed in the vicinity of the pinion shaft 22. The steering motor 24 is connected to the ECU 50, and its output shaft is coupled to the pinion shaft 22 via a reduction mechanism (not shown).

The left and right ends of the rack bar 21 are respectively connected to left and right knuckle arms of left and right wheel carriers (not shown) via left and right tie rods 25L and 25R. The left and right wheel carriers rotatably support left and right front wheels 26L, 26R, respectively, that are steered wheels, about substantially horizontal rotational axes.

Figure 2:
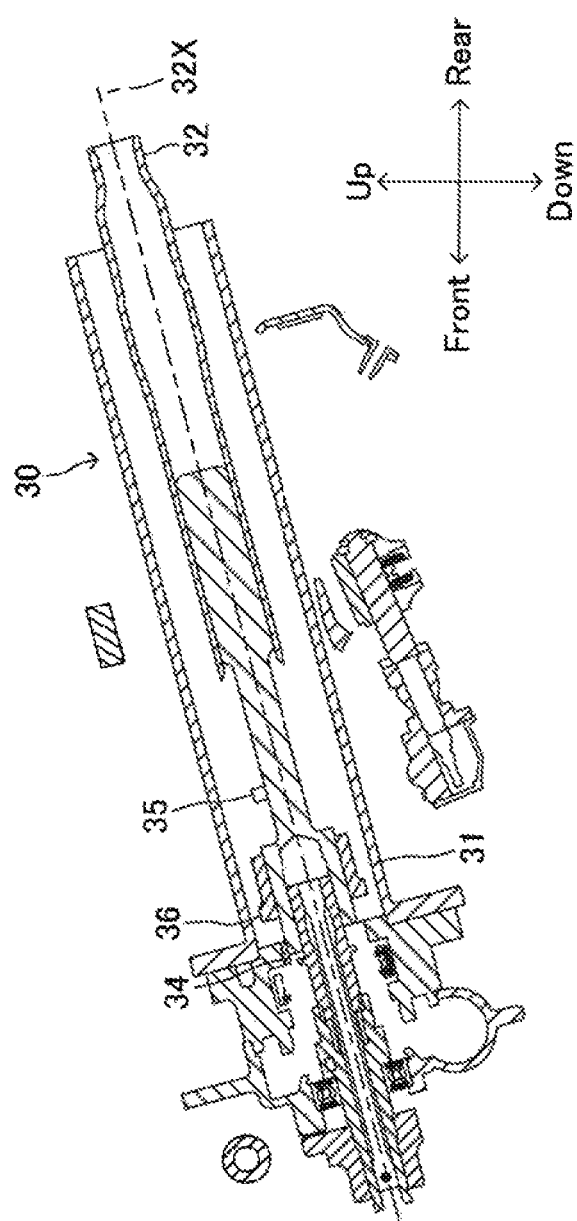
FIG. 2 is a schematic cross-sectional view taken along the line II-II in FIG. 1.

As shown in FIGS. 1 and 2, the steering column unit 30 includes a substantially cylindrical housing 31, an upper shaft 32, a steering wheel 33, a steering angle sensor 34, a steering torque sensor 35, and a fixing member 36 as main components. As will be understood from the above description, the rack-and-pinion mechanism 20 functions as a steered angle changing device that is configured to be capable of changing a steered angle of the front wheels 26L, 26R by a force generated by the steering motor 24 and is not mechanically coupled to the upper shaft 32.

The housing 31 is composed of a plurality of cylindrical members fixed to each other and coaxial with each other. As shown in FIG. 1, the axis of the housing 31 extends in the front-rear direction in a plan view, and as shown in FIG. 2, the axis of the housing 31 is inclined with respect to the horizontal direction in a side view. The upper shaft 32 is coaxial with the housing 31 and is provided in the housing 31. The upper shaft 32 is supported rotatably around its own axis and non-slidably in its own axial direction by a plurality of bearings (not shown) provided in the housing 31. The upper shaft 32 is constituted by a plurality of long metal members extending in the axial direction of the upper shaft 32 and fixed to each other. The rear end portion of the upper shaft 32 projects rearward from the rear end of the housing 31.

As shown in FIG. 1, the steering wheel 33 is fixed to the rear end of the upper shaft 32. The steering wheel 33 is provided with operation means 33a. A cable (not shown) extending from the operation means 33a passes through the inside of the steering wheel 33 and the inside of the housing 31 and is connected to the ECU 50. The ECU is an abbreviation of an electric control unit, and is an electronic control circuit having a microcomputer as a main component including a CPU, a ROM, a RAM, an interface and the like. The CPU implements various functions to be described later by executing instructions (routines, programs) stored in a memory (ROM).

As shown in FIG. 2, the steering angle sensor 34 and the steering torque sensor 35 are provided inside the housing 31. The steering angle sensor 34 detects rotational angle of the upper shaft 32 as a steering angle and the steering torque sensor 35 detects rotational torque of the upper shaft 32 as a steering torque.

As shown in FIGS. 2 to 6, the fixing member 36 is a single annular metal member, and the inner peripheral surface thereof is fixed to the outer peripheral surface near the longitudinal central portion of the upper shaft 32. In other words, a part of the upper shaft 32 in the longitudinal direction is press-fit into a mounting hole 37a defining an inner peripheral surface of an annular main portion 37 of the fixing member 36. Ten locking projections 38 are provided on the outer peripheral portion of the main body 37 at equal angular intervals in the circumferential direction. Each locking projection 38 protrudes radially outward from the outer peripheral surface of the main body 37. Amounts by which the locking projections 38 project from the outer peripheral surface of the main body 37 are the same.

Further, on the outer peripheral surface of the main body portion 37, one rotation range limiting projection 39 having a circular arc shape in cross section is provided. The rotation range limiting projection 39 is located between two locking projections 38 located at both ends in the circumferential direction. The rotation range limiting projection 39 protrudes from the outer peripheral surface of the main body 37 outward in the radial direction of the main body 37, and an amount of projection is larger than the locking projections 38. A portion which is a part of the rotation range limiting projection 39 and is located on the radially outer side of the outer peripheral surfaces of the locking projections 38 is an engaged portion 39a. In other words, the engaged portion 39a is a portion of the rotation range limiting projection 39 located on the radially outer side of a virtual arc 39b shown in FIGS. 4 to 6, and is spaced from the locking projections 38 in the rotational direction of the upper shaft 32. The virtual arc 39b is a part of a virtual circle in which the outer peripheral surface of each locking projection 38 is located. One end surface in the circumferential direction of the engaged portion 39a is a first stopper surface 39a1, and the other end surface in the circumferential direction of the engaged portion 39a is a second stopper surface 39a2. The rotation range limiting projections 39 and the locking projections 38 are located at the same position along an axis 32X of the upper shaft 32 shown in FIGS. 2 to 6. The rotation range limiting projection 39 of the present embodiment has an arc shape with a central angle of 20° centered on the axis 32X. Further, grooves 36a are formed between the adjacent locking projections 38 and between the rotation range limiting projection 39 and the adjacent locking projections 38. The circumferential dimensions of the grooves 36a are the same.

Figure 3:
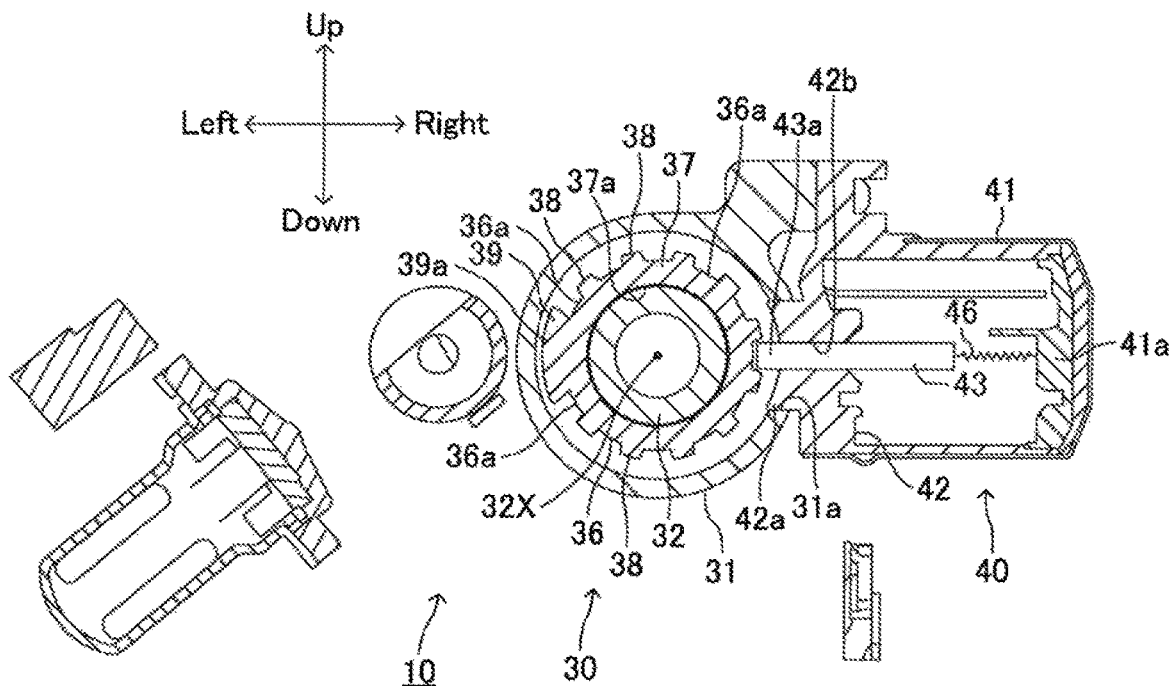
FIG. 3 is a cross-sectional view taken along the line III-III in FIG. 1 and omitting some components of a rotation range control device.

As shown in FIG. 3, a connection hole 31a having a non-circular cross-sectional shape is formed in the vicinity of the central portion in the longitudinal direction of the housing 31. A rotation range control device 40 is provided on the outer peripheral surface of the housing 31 at a position where the connection hole 31a is formed. As shown in FIGS. 3 to 6, the rotation range control device 40 includes a storage case 41, a slide member 43, a rack member 44, an electric motor 45 for the slide member and a compression coil spring 46 as main components.

As shown in FIG. 3, the storage case 41 is a metal cylindrical body whose axis extends in substantially the left-right direction, and the vicinity of the right end portion of the storage case 41 is constituted by a spring receiving portion 41a. As shown in FIGS. 3 to 6, the left end portion of the storage case 41 is configured by a support portion 42. A connection convex portion 42a having a cross-sectional shape substantially the same as that of the connection hole 31a is provided at the left end portion of the support portion 42. A support hole 42b is formed in the support portion 42 and penetrates the support portion 42 in the axial direction of the storage case 41.

The slide member 43 is a metal member having a cross-sectional shape substantially the same as that of the support hole 42b and having an axis parallel to the axis of the storage case 41, and is slidably inserted in the support hole 42b. An engaging portion 43a which is a left end portion of the slide member 43 is positioned on the left side of the connection convex portion 42a, and a right end portion of the slide member 43 is positioned in an internal space of the storage case 41. A vertical dimension of the engaging portion 43a is slightly smaller than a width of each groove 36a of the fixing member 36. A position of the slide member 43 in the direction of the axis 32X is the same as the position of the locking projections 38 and the rotation range limiting projection 39. Further, a slide stopper 43b is fixed near the right end of the slide member 43.

The rack member 44 is disposed in the internal space of the storage case 41 so as to be slidable in the axial direction of the storage case 41. The rack member 44 is formed with a slide support hole 44a which penetrates the rack member 44 in the axial direction of the storage case 41. Rack teeth 44b are formed on a top surface of the rack member 44. The slide member 43 slidably penetrates the slide support hole 44a and the rack member 44 is located on the left side of the slide stopper 43b.

Further, the electric motor 45 for the slide member is provided in the internal space of the storage case 41 and is connected to the ECU 50. A pinion 45b is fixed to an output shaft 45a of the electric motor 45 and meshes with the rack teeth 44b of the rack member 44.

Figure 4:
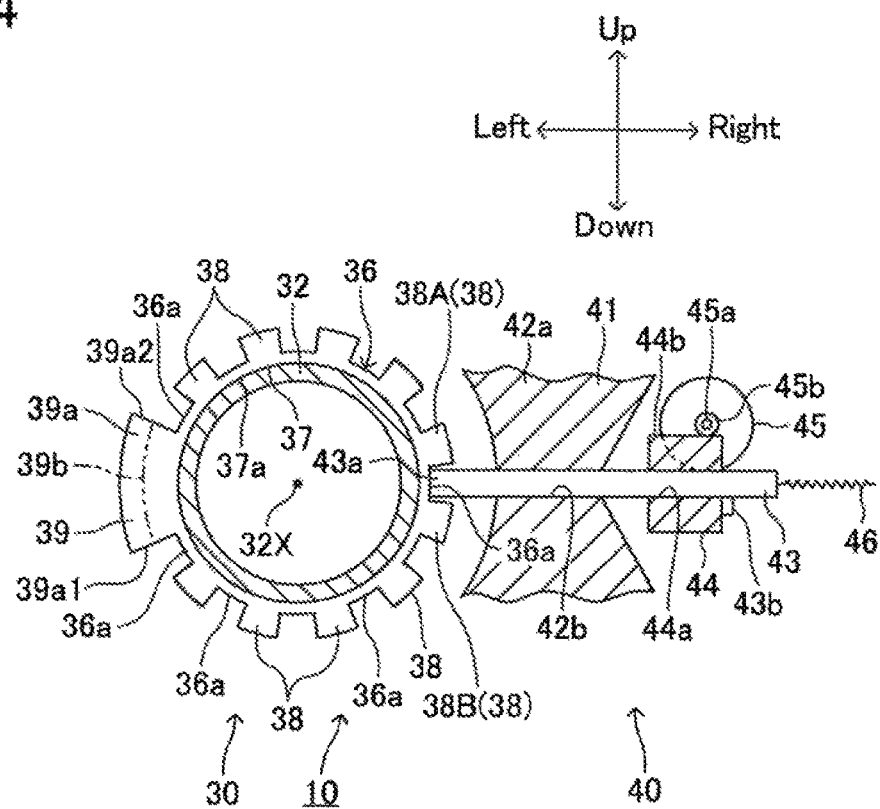
FIG. 4 is a schematic cross-sectional view of a steering column unit and the rotation range control device when an ignition switch in a vehicle is in OFF state.
Figure 5:
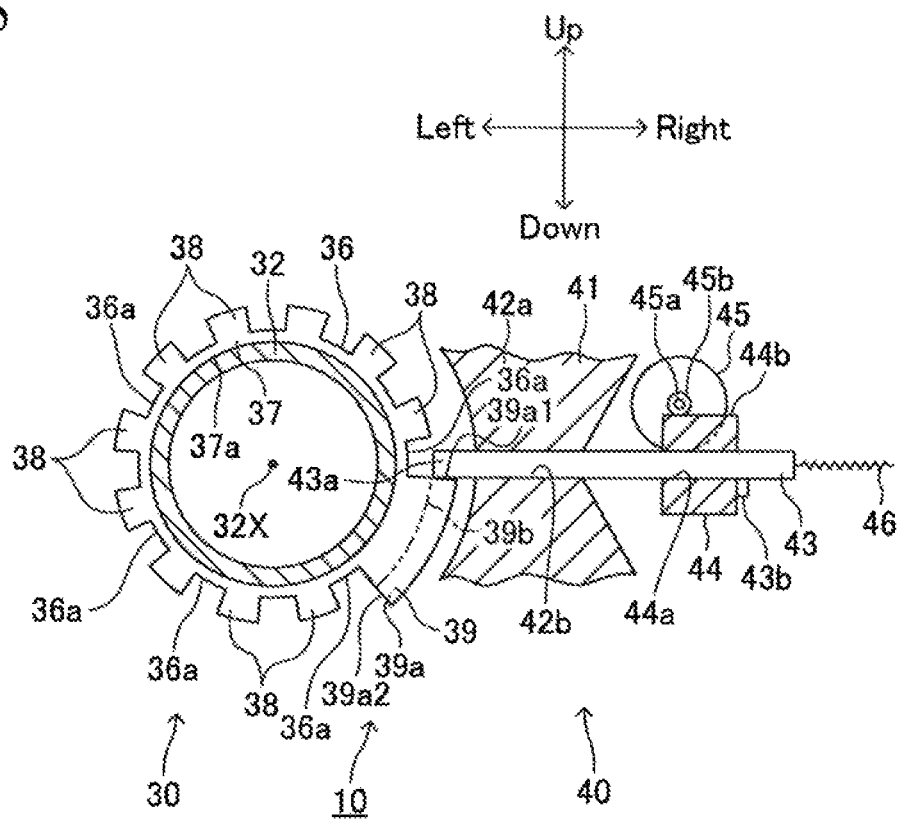
FIG. 5 is a cross-sectional view similar to FIG. 4 when the ignition switch is in ON state.

Further, the compression coil spring 46 is disposed in the internal space of the storage case 41 in a state where the spring is compressed from a free state. A left end of the spring is fixed to a right end face of the slide member 43. As shown in FIG. 3, a right end portion of the compression coil spring 46 is fixed to the spring receiving portion 41a. Accordingly, as shown in FIGS. 4 and 5, when the electric motor 45 is not energized, the slide stopper 43b contacts with a right side surface of the rack member 44 by the biasing force generated by the compression coil spring 46. Thus, the relative movement of the slide member 43 to the left with respect to the rack member 44 is restricted.

As shown in FIG. 3, the storage case 41 is fixed to the housing 31 by fitting the connection convex portion 42a into the connection hole 31a. When the storage case 41 has been fixed to the housing 31, the engaging portion 43a of the slide member 43 is positioned in the space between the inner peripheral surface of the housing 31 and the fixing member 36.

As shown in FIG. 1, an electronic device 60 (for example, an audio device) is mounted on the vehicle, and the electronic device 60 is connected to the ECU 50. When an occupant of the vehicle operates the operation means 33a provided on the steering wheel 33, the ECU 50 controls the operation of the electronic device 60.

Next, an operation of the steering apparatus 10 will be described.

First, the operation of the steering device 10 when the IG-SW is in the OFF state will be described with reference to FIG. 4. It is assumed that the steering wheel 33 is located at a neutral position and rotation axes of the left and right front wheels 26L and 26R which are steered wheels are parallel to the left-right direction. Further, the rack member 44 is assumed to be located at the first position shown in FIG. 4. Thus, the slide member 43 is biased to the left in FIG. 4 by the compression coil spring 46, and the engaging portion 43b contacts with the right end face of the rack member 44, so that the further leftward movement of the slide member 43 is restricted. The relative position of the slide member 43 to the storage case 41 in this situation is the first engagement position. The engaging portion 43a of the slide member 43 is located in the groove 36a between the locking projection 38A and the locking projection 38B which are predetermined two locking projections 38 of the fixing member 36, and minute gaps are formed between the locking projections 38A, 38B and the engaging portion 43a. Accordingly, rotation of the upper shaft 32 and the fixing member 36 about the axis 32X is substantially inhibited by the locking projections 38A, 38B and the slide member 43. The state of the steering column unit 30 and the rotation range control device 40 in this situation is referred to as a rotation prohibited state.

When the IG-SW is switched from the OFF state to the ON state, electric power of a battery (not shown) is supplied to the electric motor 45 by the control of the ECU 50, and the electric motor 45 rotates forward by a predetermined amount. As a result, the output shaft 45a is rotated, so that the rack member 44 is moved rightward by the rack tooth portion 44b and the pinion 45b to a second position shown in FIG. 5. The right end face of the rack member 44 presses the slide stopper 43b to the right, so that the slide member 43 moves to the second engagement position shown in FIG. 5 against the biasing force of the compression coil spring 46. Since the engaging portion 43a is located on the radially outer side of the virtual arc 39b, the engaging portion 43a and the locking projections 38 cannot engage with each other. Therefore, when a driver rotates the steering wheel 33, the upper shaft 32 rotates around the axis 32X.

However, the radial position of the engaging portion 43a of the fixing member 36 fixed on the upper shaft 32 is the same as that of the engaged portion 39a. Consequently, when the driver rotates the steering wheel 33 positioned at the neutral position by 170° counterclockwise, the first stopper surface 39a1 of the engaged portion 39a contacts the engaging portion 43a as shown in FIG. 5, which prohibits further rotation of the steering wheel 33 in the counterclockwise direction. On the other hand, although illustration is omitted, when the driver rotates the steering wheel 33 located at the neutral position by 170° clockwise, the second stopper surface 39a2 of the engaged portion 39a contacts the engaging portion 43a, which prohibits further rotation of the steering wheel 33 in the clockwise direction. Thus, when the IG-SW is in the ON state, the rotatable range of the upper shaft 32 and the steering wheel 33 is limited to 340° by the rotation range limiting projection 39 and the slide member 43. Therefore, when the steering wheel 33 is rotated, there is no possibility that an excessive load is applied to the cable connecting the operation means 33a and the ECU 50. The state of the steering column unit 30 and the rotation range control device 40 in this situation is referred to as a rotation range limited state.

Further, when the driver rotates the steering wheel 33 when the IG-SW is in the ON state, the steering angle sensor 34 detects a steering angle by detecting a rotation angle of the upper shaft 32, and transmits the detected value to the ECU 50. The steering torque sensor 35 detects a steering torque by detecting a torque of the upper shaft 32, and transmits the detected value to the ECU 50. The ECU 50 controls the rotation of the steering motor 24 based on the detected values. For example, when the steering wheel 33 is rotated in the counterclockwise direction, the output shaft of the steering motor 24 rotates forward, and a torque of the output shaft is transmitted to the rack teeth of the rack bar 21 via a reduction mechanism, the pinion shaft 22 and the pinion gear 23, and the rack bar 21 slide to the left to steer the front wheels 26L and 26R in the left turning direction. On the other hand, when the steering wheel 33 is rotated in the clockwise direction, the output shaft of the steering motor 24 reversely rotates, and the rack bar 21 slide to the right to steer the front wheels 26L and 26R in the right turning direction.

When an electric system between the steering angle sensor 34 and the steering torque sensor 35 and the ECU 50 completely breaks down, the ECU 50 cannot control the rotation of the steering motor 24 based on detection values of the steering angle sensor 34 and the steering torque sensor 35. Therefore, a vehicle equipped with a steer-by-wire steering apparatus may be provided with a connecting device that mechanically connects the upper shaft 32 and the pinion shaft 22 when the electric system completely breaks down. Since this connecting device includes a reduction mechanism, in order to change a steered angle of the steered wheels by a predetermined angle, a driver needs to turn the steering wheel 33 by several times the predetermined angle. Consequently, in a vehicle having such a connecting device, it is necessary to completely release the limitation on the rotation of the upper shaft 32 and the steering wheel 33 when the electric system breaks down such that the steering wheel 33 can be rotated 360° or more.

In the steering apparatus of the present embodiment, although not shown, two electric systems are provided between the steering angle sensor 34 and the steering torque sensor 35 and the ECU 50. Therefore, even if one of the electrical systems breaks down, the ECU 50 can control the rotation of the steering motor 24 based on detection values of the steering angle sensor 34 and the steering torque sensor 35 by the function of the other electrical system. Generally, there is very little risk that both electrical systems may break down together, so that in the steering apparatus of the present embodiment, the possibility is extremely low that the ECU 50 cannot control the rotation of the steering motor 24 based on detection values of the steering angle sensor 34 and the steering torque sensor 35. For that reason, the steering apparatus of the present embodiment does not have the above-mentioned connecting device. Further, in the steering apparatus of the present embodiment, regardless of the state of the two electric systems, when the IG-SW is turned on, the steering column unit 30 and the rotation range control device 40 are in the rotation range limiting state. That is, when the IG-SW is in either the ON state or the OFF state, the limitation on the rotation of the upper shaft 32 and the steering wheel 33 is not completely released regardless of whether the steering motor 24 is in the operable state or not. In other words, the states that can be realized by the steering column unit 30 and the rotation range control device 40 are only the rotation prohibiting state and the rotation range limiting state and rotation range non-limiting state is not realized.

Next, an operation of the steering apparatus 10 when the IG-SW is switched from the ON state to the OFF state will be described. When the IG-SW is switched from the ON state to the OFF state, the electric power of the battery is supplied to the electric motor 45 for the slide member by the control of the ECU 50, and the slide member motor 45 rotates reversely by a predetermined amount.

It is assumed that the upper shaft 32 and the fixing member 36 are in the rotational position shown in FIG. 4. As shown in FIG. 4, the engaging portion 43a of the slide member 43 is positioned in the groove 38a between the locking projections 38A and t 38B, and the slide stopper 43b is biased to the left by the compression coil spring 46 so that slide stopper contacts with the right end surface of the rack member 44, which restricts the further leftward movement of the slide member 43. Accordingly, the rotation of the upper shaft 32 and the fixing member 36 about the axis 32X is inhibited by the engaging portion 43a and the locking projections 38A and 38B.

Figure 6:
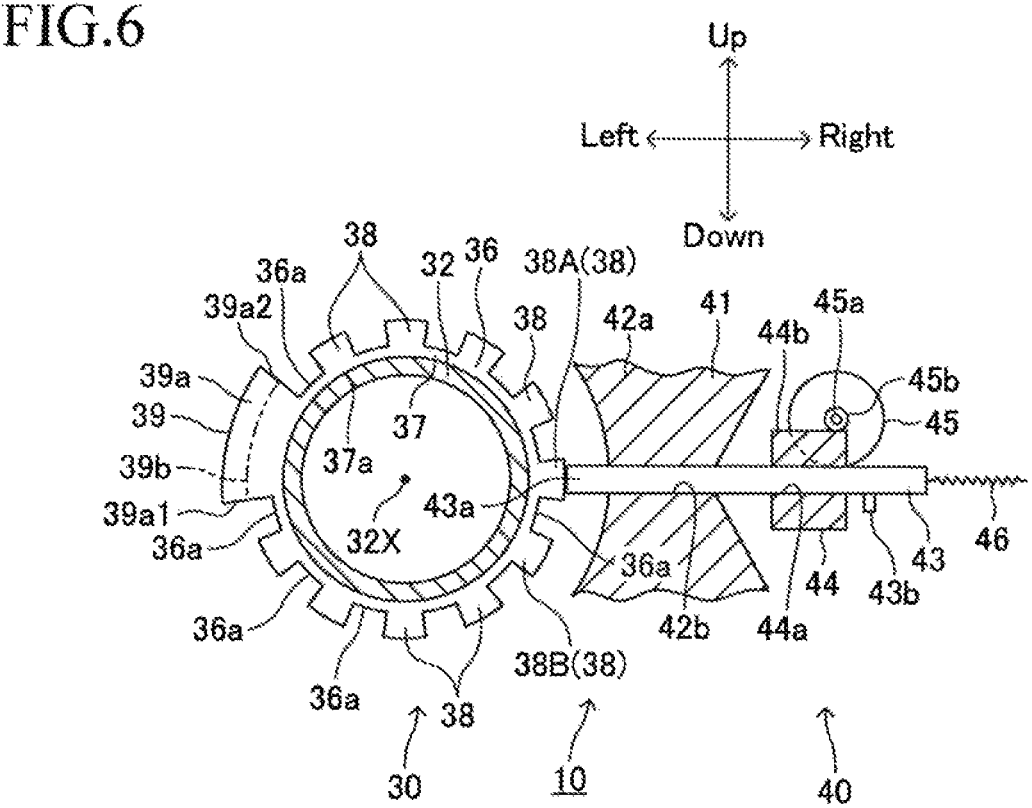
FIG. 6 is a cross-sectional view similar to FIG. 4 when the ignition switch is switched from the ON state to the OFF state and a slide member contacts an outer peripheral surface of one of locking projections.

Next, it is assumed that the IG-SW is switched from the ON state to the OFF state when the upper shaft 32 and the fixing member 36 are in the rotational position shown in FIG. 6. The rotational position of the upper shaft 32 and the fixing member 36 shown in FIG. 6 is a position slightly rotated clockwise from the position shown in FIG. 4. In this situation, when the electric motor 45 for the slide member is reversely rotated, the engagement portion 43a contacts the outer peripheral surface of the locking projection 38A, so that the locking projection 38A restricts further movement of the slide member 43 to the left side. As a result, the slide stopper 43b is separated from the right end surface of the rack member 44 to the right by a predetermined amount.

When the driver rotates the steering wheel 33 counter-clockwise by a predetermined amount in the situation where the upper shaft 32 and the fixing member 36 are in the state shown in FIG. 6, the groove 36a between the locking projections 38A and 38B and the engaging portion 43a face each other in the left-right direction. As a result, the engaging portion 43a of the slide member 43, which is biased to the left by the compression coil spring 46, enters this groove 36a. Further, the slide stopper 43b contacts the right end surface of the rack member 44, which restricts the further leftward movement of the slide member 43. That is, the steering column unit 30 and the rotation range control device 40 are in the state shown in FIG. 4.

As described above, according to this embodiment, the steering column unit 30 and the rotation range control device 40 are in the rotation range limiting state when the IG-SW is in the ON state, and are in the rotation prohibiting state when the IG-SW is in the OFF state. In other words, when the IG-SW is in either the ON state or the OFF state, the limitation on the rotation of the upper shaft 32 and the steering wheel 33 is not completely released. Therefore, there is no risk of applying an excessive load to the above mentioned cable.

Further, when the IG-SW is in either the ON state or the OFF state, the steering column unit 30 and the rotation range control device 40 can be changed to these two states by moving only the slide member 43. In other words, the rotation range limiting member is the same member as the radially movable lock member. Therefore, a motive power source for moving the slide member 43 to realize these two states may be one slide member actuator, i.e., the electric motor 45. Further, it is possible to simplify the structure of the drive mechanism for operating the slide member 43 having the rack member 44, the electric actuator 45 and the compression coil spring 46 as compared to where the steering column unit 30 and the rotation range control device 40 change to three states.

Further, the slide member 43 can selectively engage with the locking projections 38 and the rotation range limiting projection 39 by moving between the first and second engagement positions. Therefore, the steering apparatus 10 according to the present embodiment is simple in structure as compared to where a member engaging with the locking projections 38 and a member engaging with the rotation range limiting projection 39 are different from each other.

Although the present disclosure has been described in detail with reference to a specific embodiment, it will be apparent to those skilled in the art that the present disclosure is not limited to the above-described embodiments, and various other embodiments are possible within the scope of the present disclosure.

Figure 7:
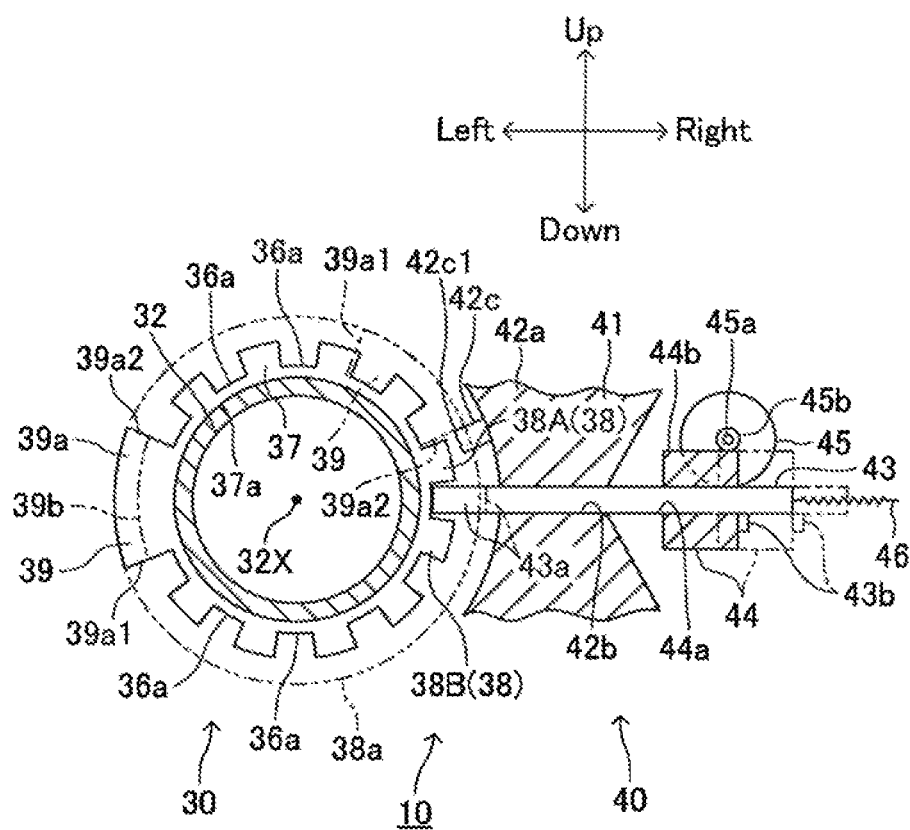
FIG. 7 is a cross-sectional view similar to FIG. 4 showing a steering column unit and a rotation range control device in a modified example of the present disclosure.

FIG. 7 shows a steering apparatus 10 according to a modification of the present disclosure. The rack member 44 in the present modification moves in the left-right direction between the first position indicated by a solid line and the second position indicated by a phantom line by controlling the rotation of the electric motor 45 for the slide member. While the first position is the same as the first position in the above embodiment, the second position is located to the right of the second position in the above embodiment. When the rack member 44 is positioned at the first position and the slide stopper 43b contacts the right side surface of the rack member 44, the slide member 43 is positioned at the engagement position corresponding to the first engagement position indicated by the solid line. On the other hand, when the rack member 44 is positioned at the second position and the slide stopper 43b contacts the right side surface of the rack member 44, the slide member 43 is positioned at a non-engagement position shown by the imaginary line. The virtual circle 38a shown in FIG. 7 represents the rotation locus of the outer peripheral surface of the rotation range limiting projection 39, and the engaging portion 43a of the slide member 43 located at the non-engagement position is on the radially outer side than the virtual circle 38a.

Further, a stopper 42c is fixed to a surface of the connection convex portion 42a of the storage case 41 facing the fixing member 36 in this modification and extends radially from the surface toward the axis 32X. The position of the stopper 42c along the axis 32X is the same as that of the slide member 43. The radial position of an engaging portion 42ci, which is the tip portion of the stopper 42c, is the same as that of the engaged portion 39a of the rotation range limiting projection 39.

Next, an operation of the steering apparatus 10 of the present modification will be described.

When the IG-SW is in the OFF state, the rack member 44 is in the first position shown by the solid line in FIG. 7 and the slide member 43 is in the engagement position. Accordingly, the rotation of the upper shaft 32 and the fixing member 36 about the axis 32X is substantially inhibited by the locking projections 38A, 38B and the slide member 43.

When the IG-SW is switched from the OFF state to the ON state, the electric motor 45 rotates forward by a predetermined amount, and accordingly, the rack member 44 moves to the second position indicated by a phantom line in FIG. 7. Then, the right end surface of the rack member 44 presses the slide stopper 43b to the right, so that the slide member 43 moves to the non-engagement position shown by a phantom line in FIG. 7 against the biasing force of the compression coil spring 46. Accordingly, the engaging portion 43a cannot engage with any locking projection 38 and the rotation range limiting projection 39. However, the radial position of the engaging portion 42c1 is always the same as that of the engaged portion 39a. Therefore, for example, when the driver rotates the steering wheel 33 clockwise by a predetermined angle, a second stopper surface 39a2 of the engaged portion 39a contacts the engaging portion 42c1 as shown by a phantom line in FIG. 7, so that further rotation of the steering wheel 33 in the clockwise direction is prohibited.

When the IG-SW is switched from the ON state to the OFF state, the electric motor 45 is reversely rotated by a predetermined amount, so that the slide member 43 moves to the engagement position as in the above embodiment.

Thus, in the present modification, the rotation range limiting member is a member different from the radially movable lock member. That is, the stopper 42c functioning as a member engaged with the rotation range limiting projection 39 is a different member from the slide member 43 functioning as a member engaged with the locking projections 38 and the members are separately provided. Therefore, the number of times the slide member 43 engages with the locking projection 38 and the number of times the stopper 42 c engages with the rotation range limiting projection 39 are less than the number of times the slide member 43 engages with the locking projections 38 and the rotation range limiting projection 39 in the embodiment, so that the slide member 43 and the stopper 42c are less deteriorated than the slide member 43 in the above-mentioned embodiment.

The housing 31 may be provided with a hole for slidably supporting the slide member 43.

The stopper 42c may be fixed to the inner circumferential portion of the housing 31.

Further, a known road surface reaction force applying device that estimates (calculates) a reaction force that the steered wheels receive from a road surface when the steering wheel 33 is rotated and applies a force corresponding to the reaction force to the upper shaft 32 may be provided in the steering apparatus 10.

The present disclosure may be applied to a hybrid vehicle equipped with an internal combustion engine and an electric motor as drive sources, a fuel cell vehicle (FC vehicle) and/or an EV vehicle (electric vehicle).

Notably, when the present disclosure is applied to an EV vehicle, for example, a drive source switch that switches an electric motor, which is a drive source of the vehicle, between a rotatable state and a non-rotatable state is a ready switch.

What is claimed is:

1. A steer-by-wire steering apparatus comprising:
   an upper shaft that rotates with a steering wheel;
   a steered angle changing device that includes a steering actuator, is configured to be capable of changing a steered angle of steered wheels by a force generated by the steering actuator and is not mechanically coupled to the upper shaft;
   a plurality of locking projections that are fixed to the upper shaft so as to be arranged in the rotational direction of the upper shaft and project radially outward of the upper shaft;
   a rotation range limiting projection that is fixed to the upper shaft and has an engaged portion that is spaced from the locking projections in the rotational direction of the upper shaft and is located on the radially outer side of outer peripheral ends of the locking projections;
   a radially movable lock member that is located at the same axial position of the upper shaft as that of the locking projections and is configured to be located on the radially outer side than the locking projections when a drive source switch, which switches between an ON state that enables a vehicle drive source to operate and an OFF state that disables the vehicle drive source to operate, is in the ON state, and to have at least a part located at the same radial position as the locking projections when the drive source switch is in the OFF state; and
   a rotation range limiting member that is located at the same axial position as that of the rotation range limiting projection and is configured to have at least a part located at the same radial position as the engaged portion regardless of whether or not the steering actuator is in an operable state when the drive source switch is at least in the ON state.

2. The steer-by-wire steering apparatus according to claim 1, wherein
   the rotation range limiting member is the same member as the radially movable lock member, and
   when the drive source switch is in the ON state, the radial position of at least a part of the radially movable lock member is the same as the engaged portion regardless of whether or not the steering actuator is in an operable state.

3. The steer-by-wire steering apparatus according to claim 1, wherein
   the rotation range limiting member is a member different from the radially movable lock member,
   the radial position of the rotation range limiting member is always the same as the engaged portion, and
   when the drive source switch is in the ON state, the radially movable lock member is positioned on the radially outer side than the engaged portion.

* * * * *